(12) United States Patent
Vogel et al.

(10) Patent No.: US 7,659,322 B1
(45) Date of Patent: Feb. 9, 2010

(54) SYNTHESIS OF ANHYDRIDE CONTAINING POLYMERS BY MICROWAVE RADIATION

(75) Inventors: Brandon M. Vogel, Gaithersburg, MD (US); Surya K Mallapragada, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 613 days.

(21) Appl. No.: 11/275,168

(22) Filed: Dec. 16, 2005

Related U.S. Application Data

(60) Provisional application No. 60/636,643, filed on Dec. 16, 2004, provisional application No. 60/709,162, filed on Aug. 18, 2005.

(51) Int. Cl.
| | | |
|---|---|---|
| C08F 2/48 | (2006.01) | |
| C08J 3/28 | (2006.01) | |
| C08F 20/00 | (2006.01) | |
| C08F 20/08 | (2006.01) | |
| C08F 120/00 | (2006.01) | |
| C08F 120/08 | (2006.01) | |
| C08F 220/00 | (2006.01) | |

(52) U.S. Cl. .............. 522/164; 522/1; 522/77; 522/83; 522/162; 522/178; 522/176; 522/182; 526/72; 526/317.1; 526/318.2; 526/318.1; 284/489; 284/494

(58) Field of Classification Search .............. 522/1, 522/77, 83, 162, 164, 178, 182; 526/72; 526/317.1, 318.2, 318.1; 264/489, 494
See application file for complete search history.

(56) References Cited

U.S. PATENT DOCUMENTS

| 4,888,176 A | 12/1989 | Langer et al. |
| 5,237,032 A | 8/1993 | DeMeuse et al. |
| 6,515,040 B1 | 2/2003 | Scola et al. |
| 2002/0022675 A1 | 2/2002 | Choi et al. |

FOREIGN PATENT DOCUMENTS

| DE | 3036314 | 4/1981 |
| EP | 0266603 A1 | 5/1988 |
| JP | 60-144331 | 7/1985 |
| JP | 63-289020 | 11/1988 |
| JP | 3-281606 | 12/1991 |
| JP | 5-306336 | 11/1993 |
| JP | 5-310907 | 11/1993 |
| WO | WO-99/02454 A1 | 1/1999 |
| WO | WO-01/47631 A1 | 7/2001 |

OTHER PUBLICATIONS

Vogel et al "Rapid Synthesis of Polyanhydrides by Microwave Polymerization", Macromol. Rapid Commun., 25, (online 2003), 330-333. [retrieved on Oct. 14, 2008]. Retreived from the internet:<http://www3.interscience.wiley.com/journal/106570136/issue>.*

Albert, P., et al., "Comparison of Thermal and Microwave-Activated Polymerization of εCaprolactone With Titanium Tetrabutylate as Catalyst", *Macromol. Chem. Phys.*, 197, (1990), 1633-1641.

Anastasiou, T. J., et al., "Novel Polyanhydrides With Enhanced Thermal and Solubility Properties", *Macromolecules*,33, (2000), 6217-6221.

Bedell, C., et al., "Processing and Hydrolytic Degradation of Aromatic, *Ortho*-Substituted Polyanhydrides", *Journal of Applied Polymer Science*, 80 , (2001), 32-38.

Bucher, J. E., et al., "The Anhydrides of Isophthalic and Terephthalic Acids", *Journal of the American Chemical Society*, 31(12), (1909), 1319-1321.

Campo, C. J., "Polyanhydrides: the Effects of Ring Substitution Changes on Polymer Properties", *Polymer Bulletin*, 42(1), (1999), 61-68.

Carothers, W. H., "Studies of Polymerization and Ring Formation. I. An Introduction to the General Theory of Condensation Polymers", *The Journal of the American Chemical Society*, 51(8), (1929),2548-2569.

Carter, K. R., "Nickel(O) Mediated Coupling Polymerizations via Microwave-Assisted Chemistry", *Macromolecules*, 35(18), (2002),6757-6759.

Chiba, M., et al., "Controlled Protein Delivery From Biodegradable Tyrosine-Containing Poly(anhydride-co-imide) Microspheres", *Biomaterials*, 18(13), (1997), 893-901.

Cleland, J. L., et al., "Emerging Protein Delivery Methods", *Current Opinion in Biotechnology*12(2), (2001), 212-219.

Dallinger, D. , et al., "High-Throughput Synthesis of *N*3-Acylated Dihydropyrimidines Combining Microwave-Assisted Synthesis and Scavenging Techniques", *Organic Letters*, 5(8), (2003),1205-1208.

Domb, A. J., et al., "Absorbable Biopolymers Derived from Dimer Fatty Acids", *Journal of Polymer Science, Part A: Polymer Chemistry*, 31(5), (1993), 1275-1285.

Domb, A. J., et al., "Poly(anhydrides). 3. Poly(anhydrides) Based on Aliphatic-Aromatic Diacids", *Macromolecules*, 22, (1989), 3200-3204.

Domb, A. J., "Polyanhydrides. I. Preparation of High Molecular Weight Polyanhydrides", *Journal of Polymer Science: Part A: Polymer Chemistry*, 25(12), (1987), 3373-3386.

Fang, X., et al., "Microwave Synthesis of Poly(ε-caprolactam-co-ε-caprolactone", *Journal of Polymer Science: Part A: Polymer Chemistry*, 38, (2000), 1379-1390.

Fang, X., et al., "Ring Opening Polymerization Via Microwave Irradiation", *Book of Abstracts, 216th ACS National Meeting*, (Abstract No. PMSE-279),(1998), 1 pg.

(Continued)

*Primary Examiner*—Sanza L McClendon
(74) *Attorney, Agent, or Firm*—Schwegman, Lundberg & Woessner, P.A.; Michael Haukaas

(57) ABSTRACT

The invention provides a method for preparing a polyanhydride by irradiating one or more diacids with microwave radiation in the presence of a carboxylic anhydride so as to acylate the one or more diacids to yield at least one prepolymer, and irradiating the prepolymer with microwave radiation so as to polymerize said prepolymer to yield the polyanhydride, as a homopolymer or a copolymer. High purity polyanhydrides can be prepared by this method. Reaction times compared to conventional melt polycondensations can be significantly reduced. Copolymer polyanhydrides can also be prepared by the microware radiation techniques described herein.

22 Claims, 1 Drawing Sheet

OTHER PUBLICATIONS

Fang, X., et al., "Ring Opening Polymerization via Microwave Irradiation", *Polymeric Materials Science and Engineering*, 79, (1998), 518-519.

Fang, X., et al., "Ring-Opening Polymerization of ε-Caprolactam and ε-Caprolactone via Microwave Irradiation", *Journal of Polymer Science: Part A: Polymer Chemistry*, 40, (2002), 2264-2275.

Fu, J., et al., "New Polymeric Carriers for Controlled Drug Delivery Following Inhalation or Injection", *Biomaterials*, 23(22), (2002),4425-4433.

Glass, B. M., et al., "Case Study 4-6—Rapid Parallel Synthesis Utilizing Microwave Irradiation", *In: High-Throughput Synthesis*, Marcel Dekker, Inc., New York, NY,(2001), 123-128.

Gonzalez, J. I., et al., "Polyanhydride-Imides", *Die Angewandte Makromolekulare Chemie*, 55(1), (1976), 85-96.

Göpferich, A., et al., "The Influence of Microstructure and Monomer Properties on the Erosion Mechanism of a Class of Polyanhydrides", *Journal of Polymer Science, Part A: Polymer Chemistry*, 31(10), (1993),2445-2458.

Griffin, A. C., et al., "Mesogenic Polymers. III. Thermal Properties and Synthesis of Three Homologous Series of Thermotropic Liquid Crystalline "Backbone" Polyesters", *Journal of Polymer Science: Polymer Physics Edition*, 19, (1981), 951-969.

Hanes, J., et al., "Synthesis and Characterization of Degradable Anhydride-*co*-imide Teropolymers Containing Trimellitylimido-L-tyrosine: Novel Polymers for Drug Delivery", *Macromolecules*, 29(16), (1996), 5279-5287.

Hill, J. W., et al., "Studies of Polymerization and Ring Formation. XIV. A Linear Superpolyanhydride and a Cyclic Dimeric Anhydride From Sebacic Acid", *The Journal of the American Chemical Society*, 54(4), (Apr. 1932), 1569-1579.

Hill, J. W., et al., "Studies of Polymerization and Ring Formation. XIX. Many-Membered Cyclic Anhydrides", *The Journal of the American Chemical Society*, 55(12), (Dec. 1933), 5023-5031.

Hill, J. W., et al., "Studies of Polymerization and Ring Formation. XXI. Physical Properties of Macrocyclic Esters and Anhydrides. New Types of Synthetic Masks", *Journal of the American Chemical Society*, 55(12), (1933), 5039-5043.

Imai, Y., et al., "A New Facile and Rapid Synthesis of Aliphatic Polyamides by Microwave-Assisted Polycondensation of ω-Amino Acids and Nylon Salts", *Polymer Journal*, 28(3), (1996), 256-260.

Imai, Y., et al., "A New Facile and Rapid Synthesis of Aliphatic Polypyromellitimides by Microwave-Assisted Polycondensation of Salt Monomers Composed of Aliphatic Diamines and Pyromellitic Acid", *Journal of Polymer Science: Part A: Polymer Chemistry*, 34, (1996), 701-704.

Jiang, H. L., et al., "Preparation, Characterization and Degradation Characteristics of Polyanhydrides Containing Poly(ethylene Glycol)", *Polymer International*, 48, (1999), 47-52.

Kappe, C. O., "High-Speed Combinatorial Synthesis Utilizing Microwave Irradiation", *Current Opinion in Chemical Biology*, 6, (2002), 314-320.

Kaur, S., et al., "Synthesis and Characterization of a Fluorinated Polyanhydride", *Journal of Polymer Science*, 40(17), (2002), 3027-3036.

Keki, S., et al., "Fast Microwave-Mediated Bulk Polycondensation of D, L -Lactic Acids", *Macromolecular Rapid Communications*, 22(13), (2001), 1063-1065.

Kieser, J., et al., "High Rate, Large Area Application of the Plasma Polymerization (PP) Process", *Proceedings of the International Ion Engineering Congress—The 7th Symposium on Ion Sources and Ion Assisted Technology(ISIAT '83)* 3, (1983), 1447-1450.

Kieser, J., et al., "Industrial Microwave Plasma Polymerization", *Thin Solid Films*, 118, (1984), 203-210.

Kipper, M. J., et al., "Design of an Injectable System Based on Bioerodible Polyanhydride Microspheres for Sustained Drug Delivery", *Biomaterials*, 23(22), (Nov. 2002), 4405-4412.

Koroskenyi, B., et al., "Microwave-Assisted Solvent-Free or Aqueous-Based Synthesis of Biodegradable Polymers", *Journal of Polymers and the Environment*, 10(3), (Jul. 2002), 93-104.

Krasko, M. Y., et al., "Poly(ester anhydride)s Prepared by the Insertion of Ricinoleic Acid into Poly(sebacic acid)", *Journal of Polymer Science, Part A: Polymer Chemistry*, 41(8), (2003), 1059-1069.

Krasko, M. Y., et al., "Polyanhydrides With Hydrophophobic Terminals", *Polymers for Advanced Technologies*, 13(10-12), (2002), 960-968.

Kumar, N., et al., "Biodegradable Block Copolymers", *Advanced Drug Delivery Reviews*, 53, (2001),23-44.

Kumar, N., et al., "Polyanhydrides: An Overview", *Advanced Drug Delivery Reviews*, 54(7), (2004), 889-910.

Larobina, D., et al., "Mechanistic Understanding of Degradation in Bioerodible Polymers for Drug Delivery", *AIChE Journal*, 48(12), (Dec. 2002), 2960-2970.

Liao, L., et al., "Heating Characteristics and Polymerization of ε-Caprolactone Under Microwave Irradiation", *Polymer Preprints*, 44(1), (2003),864-865.

Liao, L. Q., et al., "Microwave-Assisted Ring-Opening Polymerization of ε-Caprolactone", *Journal of Polymer Science: Part A: Polymer Chemistry*, 40, (2002), 1749-1755.

Liu, L. J., et al., "Microwave-Assisted Polycondensation of L-2-Hydroxy-3-phenylpropanoic Acid", *Chinese Chemical Letters*, 12(9), (2001), 761-762.

Liu, L. J., et al., "Microwave-Assisted Polymerization of D, L-Lactide With Stannous Octanoate as Catalyst", *Chinese Chemical Letters*, 12(8), (2001), 663-664.

Lord, J. J., "High-Throughput Microwave Accelerated Combinatorial Synthesis: A Plate-Based Approach", *Abstracts of Papers, 225th ACS National Meeting*, (Abstract No. ORGN-63),(2003), 1 pg.

Lu, J., et al., "Microwave Radiation Copolymerization in Solid State of Maleic Anhydride and Allylthiourea", *Journal of Applied Polymer Science*, 68(10), (1998), 1563-1566.

Lu, J., et al., "Microwave Sold-State Polymerization of Malleic Anhydride", *Gaofenzi Cailiao Kexue Yu Gongcheng*15(1), (Jan. 1999), 158-160.

Lu, J., et al., "Polymerization of m,m1-diaminobenzophenone and pyromellitic dianhydride by Microwave Radiation", *Gaofenzi Cailiao Kexue Yu Gongcheng*, 18(1), (2002), 33-36.

Mallakpour, S. E., et al., "Microwave-Assisted Polycondensation of 4,4'-(Hexafluoroisopropylidene)-$N$, $N'$-bis(phthaloyl-L-leucine) Diacid Chloride With Aromatic Diols", *Journal of Applied Science*, 77, (2000), 3003-3009.

Mallakpour, S. E., et al., "Microwave-Assisted Synthesis of New Optically Active Poly(ester-imides)s Containing $N$, $N'$-(pyromellitoyl)-bis-L-phenylalanine Moieties", *Journal of Applied Polymer Science*, 86(9), (2002), 2211-2216.

Mallakpour, S. E., et al., "Novel Optically Active Poly(amide-imide)s From $N$, $N'$-(4,4'-carbonyldiphthaloyl)-bis-L-phenylalanine Diacid Chloride and Aromatic Diamines by Microwave Irradiation", *European Polymer Journal*, 38, (2002), 475-485.

Mallakpour, S. E., et al., "Polymerization of 4,4'-(Hexafluoroisopropylidene)- $N,N'$-bis(phthaloyl-L-leucine) Diacid Chloride With Aromatic Diamines by Microwave Irradiation", *Journal of Polymer Science: Part A: Polymer Chemistry*, 38, (2000), 1154-1160.

Mallon, F. K., et al., "Enhancement of Solid-State Polymerization With Microwave Energy", *Journal of Applied Polymer Science*, 69(6), (1998), 1203-1212.

McCann, D. L., et al., "Characterization of Chemical Structure and Morphology of Eroding Polyanhydride Copolymers by Liquid-State and Solid-State $^1$H n.m.r.", *Polymer*, 40, (1999), 2151-2162.

McCarthy, S. P., et al., "Synthesis of Biodegradable Polymers Activated by Microwave Radiation", *Polymeric Materials Science and Engineering*, 86, (2002), 350-351.

Park, K. H., et al., "Rapid Synthesis of Aromatic Polyamides by Microwave-Assisted Directed Polycondensation of Aromatic Diamines With Aromatic Dicarboxilic Acids", *Polymer Journal*, 25(2), (1003), 209-213.

Ron, E., et al., "NMR Characterization of Erodible Copolymers", *Macromolecules*, 24(9), (1991), 2278-2282.

Shen, E., et al., "Mechanistic Relationships Between Polymer Microstructure and Drug Release Kinetics in Bioerodible Polyanhydrides", *Journal of Controlled Release*, 82(1), (2002), 115-125.

Song, Y., et al., "Microwave-Assisted Polymerization of ε-Caprolactone With Maleic Acid as Initiator and Drug Release Behavior of Ibuprofen-Poly(ε-caprolactone) System", *Chinese Chemical Letters*, 14(1), (2003), 32-34.

Staubli, A., et al., "Hydrolytically Degradable Amino Acid-Containing Polymers", *Journal of the American Chemical Society*, 112(11), (1990), 4419-4424.

Staubli, A., et al., "Sequence Distribution and its Effect on Glass Transition Temperatures of Poly(anhydride-*co*-imides) Containing Asymmetric Monomers", *Macromolecules*, 24(9) (1991), 2291-2298.

Teomim, D., et al., "Fatty Acid Terminated Polyanhyrides", *Journal of Polymer Science, Part A: Polymer Chemistry*, 37(16), (1999), 3337-3344.

Teomim, D., et al., "Nonlinear Fatty Acid Terminated Polyanhydrides", *Biomacromolecules*, 2(1), (2001), 37-44.

Teomim, D., et al., "Ricinoleic Acid-Based Biopolymers", *Journal of Biomedical Materials Research*, 45(3), (1999),258-267.

Uhrich, K E., "Synthesis and Characterization of Degradable poly(anhydride-*co*-imides)", *Macromolecules*, 28 (7), (1995), 2184-2193.

Vogel, B., et al., "Rapid Synthesis of Polyanhydrides by Microwave Polymerization", *Macromol. Rapid. Commun.*, 25, (2004), 330-333.

Vogel, B. M., et al., "Synthesis of Novel Biodegradable Polyanhydrides Containing Aromatic and Glycol Functionality for Tailoring of Hydrophilicity in Controlled Drug Delivery Devices", *Biomaterials*, 26, (2005),721-728.

Yu, Z., et al., "Microwave Irradiation Effect on the Polymerization of ε-Caprolactone With Benzoic Acid as Initiator", *Polymer Preprints, American Chemical Society, Division of Polymer Chemistry*, 44(1), (2003), 868-869.

Yu, Z. J., et al., "Microwave-Improved Polymerization of e-Caprolactone Initiated by Carboxylic Acids", *Journal of Polymer Science: Part A: Polymer Chemistry*, 41, (2002), 13-21.

Zhang, T., et al., "Degradation and Drug Delivery Properties of poly(1,4-cyclohexanedicarboxylic anhydride)", *Journal of Biomaterials Science, Polymer Edition*, 12(5), (2001), 491-501.

Zhang, C., et al., "Microwave-Assisted Ring Opening Polymerization of Trimethylene Carbonate", *Polymer Preprints, American Chemical Society, Division of Polymer Chemistry*, 44(1), (2003),874-875.

Zhang, T., et al., "Synthesis and Properties of Poly (1,4-cyclohexanedicarboxylic anhydride)", *Polymer Bulletin*, 45(3), (2000), 223-229.

Zhang, T., et al., "Synthesis, Degradation, and Drug Delivery of Cycloaliphatic Poly(ester anhydride)s", *Journal of Applied Polymer Science*, 86(10), (2002), 2509-2514.

\* cited by examiner

SYNTHESIS OF ANHYDRIDE CONTAINING POLYMERS BY MICROWAVE RADIATION

RELATED APPLICATIONS

This application claims priority under 35 U.S.C. §119(e) from U.S. Provisional Application Ser. Nos. 60/636,643 filed Dec. 16, 2004 and 60/709,162 filed Aug. 18, 2005, which are incorporated herein by reference.

BACKGROUND

Polyanhydrides have emerged as an important class of biodegradable polymers. Polyanhydrides have found widespread application in the controlled delivery of drugs, proteins, and vaccines. The conventional method of synthesizing polyanhydrides is by melt polycondensation of acetylated dicarboxylic acid prepolymers. This method affords high-molecular-weight polymers with good yields. Melt condensation polymerizations, however typically take about 1 to 3 hours to conduct. Additionally, the preparation and isolation of the acetylated prepolymer can take up to four days, including drying time and recrystallization.

Purity is an important consideration of polyanhydrides because these biocompatible polymers are often used for in-vitro and in-vivo studies. In this age of rapid drug discovery and advances in protein and macromolecular therapies, determining the correct polymer system and compositions are of the utmost importance to effectively stabilize the target drug. Therefore, there is considerable interest in the efficient synthesis of high-purity materials in a high throughput manner for material library screening. The rapid synthesis of some polymers through the use of microwave radiation and dielectric heating has been described in the literature (see for example, K. R. Carter, *Macromolecules,* 2002, 35, 6757). However, improved methods are needed to prepare high purity samples of polyanhydrides from diacids. New methods to prepare high purity polyanhydrides are also needed.

SUMMARY

The invention provides a method for preparing a polyanhydride that includes irradiating one or more diacids, wherein the one or more diacids include an aromatic dicarboxylic acid, an aliphatic dicarboxylic acid, or a mixture thereof, with microwave radiation in the presence of a carboxylic anhydride so as to acylate one or more diacids to yield at least one prepolymer; and irradiating the prepolymer with microwave radiation so as to polymerize said prepolymer to yield the polyanhydride, as a homopolymer or a copolymer.

The prepolymers are made up of dicarboxylic acids ("diacids") that are acylated at both acid moieties. A prepolymer can be a single acylated diacid unit (monomer), or it can have up to about 12 condensed diacid units. A mixture of different diacids can be employed. The mixture of diacids can yield a random copolymer. The one or more diacids can include a diacid-substituted $C_2$-$C_{12}$ straight or branched chain alkane that is optionally interrupted by about 1 to about 5 —Ph—, —O—, —CH=CH—, and/or —N(R)— groups wherein R is H, phenyl, benzyl, or ($C_1$-$C_6$)alkyl. The one or more diacids can also be optionally interrupted by about 1 to about 12-OCH$_2$CH$_2$O— groups. The one or more diacids can also be optionally substituted with 1, 2, or 3 trifluoromethyl, trifluoromethoxy, ($C_1$-$C_6$)alkyl, ($C_1$-$C_6$)alkenyl, or oxo groups, or combinations thereof.

The at least one diacid can be a 1,ω-bis(carboxy)alkane. The at least one diacid can also be a 1,ω-bis(4-carboxyphenoxy)alkane. The alkane can be, for example, a ($C_3$-$C_8$)alkane. Specific examples of the alkane include hexane and octane. The diacid can be 1,6-bis(4-carboxyphenoxy)hexane. Alternatively, the diacid can be 1,6-bis(carboxy)octane (sebacic acid).

The at least one prepolymer can include a bis(carboxylic acid acetyl ester), or an anhydride oligomer thereof. The at least one prepolymer can also include a 1,ω-(4-acetoxycarbonylphenoxy)alkane, or an anhydride oligomer thereof.

The prepolymer can be formed in situ by irradiating a mixture of (a) a carboxylic anhydride and (b) the aromatic dicarboxylic acid, the aliphatic dicarboxylic acid, or the mixture thereof, with an amount of microwave radiation effective to form the prepolymer.

The carboxylic anhydride can be a bis-alkyl carboxylic anhydride, a bis-aryl carboxylic anhydride, an alkyl-aryl carboxylic anhydride, or a mixture thereof. The carboxylic anhydride can be, for example, acetic anhydride, trifluoroacetic anhydride, or benzoic anhydride. A molar excess of the carboxylic anhydride can be employed. Excess carboxylic anhydride can be removed after the prepolymer has formed.

The radiation polymerization can be conducted in the presence of an effective amount of a catalyst. The catalyst can include glass beads. The irradiation of the prepolymer or prepolymer mixture can be carried out in the absence of solvent. The irradiation of the carboxylic anhydride and the aromatic dicarboxylic acid, the aliphatic dicarboxylic acid, or the mixture thereof, can also be carried out in the absence of solvent.

The invention also provides a method for preparing a polyanhydride by irradiating a prepolymer with microwave radiation so as to polymerize the prepolymer to yield the polyanhydride, as a homopolymer or a copolymer.

The invention further provides a method for preparing a polyanhydride that includes irradiating one or more diacids, wherein the one or more diacids include a 1,ω-bis(carboxy)alkane, a 1,ω-bis(carboxyphenoxy)alkane, or a mixture thereof, with microwave radiation in the presence of acetic anhydride so as to acylate one or more diacids to yield at least one prepolymer, wherein the prepolymer is formed in situ by employing a molar excess of the acetic anhydride;

removing excess acetic anhydride after the prepolymer is formed; and irradiating the prepolymer with microwave radiation so as to polymerize said prepolymer to yield the polyanhydride, as a homopolymer or a copolymer.

The polyanhydrides prepared by microware radiation techniques are typically of high purity. The polyanhydrides can be greater than about 99% pure as determined by NMR spectroscopy.

DETAILED DESCRIPTION

Figure 1:
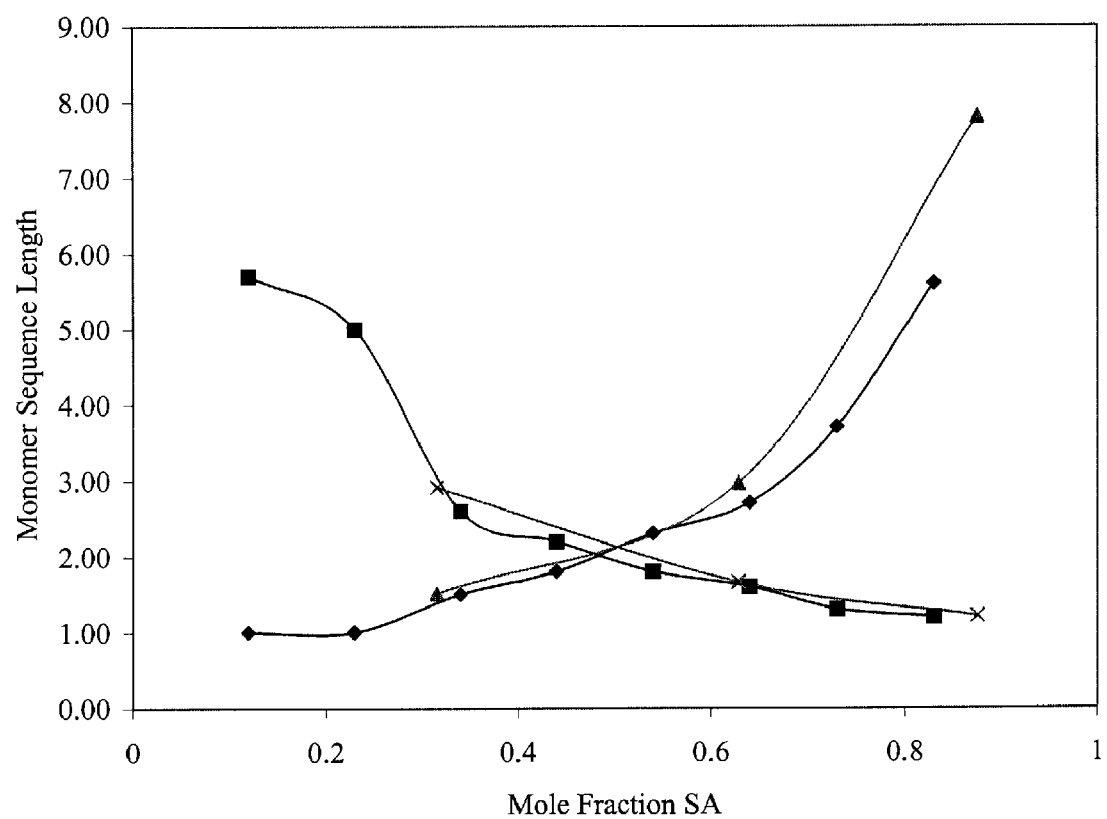
FIG. 1 illustrates monomer sequence length as a function of copolymer composition in poly(CPH-co-SA) polymerized both conventionally (as described by Ron et al. *Macromolecules* 1991, 24, 2278) and by microwave heating, as described herein; legend: ⟶n units of sebacic acid (as prepared by Ron et al.), ⟶n units of 1,6-bis-(p-carboxyphenoxy)hexane (as prepared by Ron et al.), ⟶n units of sebacic acid (prepared by microwave polymerization), ⟶n units of 1,6-bis-(p-carboxyphenoxy)hexane (prepared by microwave polymerization).

The following definitions are used, unless otherwise described. Specific and preferred values listed below for radicals, substituents, and ranges, are for illustration only; they do not exclude other defined values or other values within defined ranges for the radicals and substituents. Alkyl, alkoxy, alkenyl, etc. denote both straight and branched groups.

The group "alkyl" refers to a linear or branched hydrocarbon radical or diradical that is optionally unsaturated and optionally substituted with functional groups as described herein. The alkyl group can contain 1 to about 20 carbon atoms. Typical alkyl groups include, but are not limited to, methyl, ethyl, propyl, isopropyl, butyl, iso-butyl, sec-butyl, tert-butyl, pentyl, 3-pentyl, hexyl, heptyl, octyl, or decyl. In one embodiment, alkyl is preferably $(C_1-C_6)$alkyl. In another embodiment, alkyl is preferably $(C_1-C_4)$alkyl.

In an embodiment where the alkyl group is unsaturated, the alkyl is an alkenyl group or an alkynyl group. Alkenyl can be, for example, vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. The alkenyl can be unsubstituted or substituted. Alkynyl can be, for example, ethynyl, 1-propynyl, 2-propynyl, 1-butynyl, 2-butynyl, 3-butynyl, 1-hexynyl, 2-hexynyl, 3-hexynyl, 1-octynyl, and the like. The alkynyl can be unsubstituted or substituted.

As used herein, "aryl" refers to an aromatic hydrocarbon derived from a parent aromatic ring system. The aryl can be linked to another group at a saturated or unsaturated carbon atom of the parent ring system. The aryl group can have 6 to about 14 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or substituted as described herein.

The term "halo" refers to fluoro, chloro, bromo, and iodo. Similarly, the term "halogen" refers to fluorine, chlorine, bromine, and iodine.

"Substituted" is intended to indicate that one or more (e.g., 1, 2, 3, 4, or 5; in some embodiments 1, 2, or 3; and in other embodiments 1 or 2) hydrogen atoms on the group indicated in the expression using "substituted" is replaced with a selection from the substituents described hereinbelow, or with a suitable group known to those of skill in the art, provided that the indicated substituted atom's normal valency is not exceeded, and that the substitution results in a stable compound. Suitable substituent groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, acylamino, nitro, difluoromethyl, trifluoromethyl, trifluoromethoxy, carboxy, carboxyalkyl, keto, thioxo, alkylthio, alkylsulfinyl, alkylsulfonyl, and cyano. The suitable substituent groups can also include, e.g., —X, —R, —OR, —SR, —NR$_2$, —NR$_3$, =NR, —CX$_3$, —CN, —OCN, —SCN, —N=C=O, —NCS, —NO, —NO$_2$, =N$_2$, —N$_3$, NC(=O)R, —C(=O)R, —C(=O)NRR, —S(=O)$_2$OH, —S(=O)R, —S(=O)$_2$R, —OS(=O)$_2$OR, —S(=O)$_2$NR, —OP(=O)(OR)$_2$, —P(=O)(OR)$_2$, —P(=O)(OH)$_2$, —C(=O)R, —C(=O)X, —C(S)R, —C(O)OR, —C(S)OR, —C(O)SR, —C(S)SR, —C(O)NRR, —C(S)NRR, —C(NR) NRR, where each X is independently a halogen ("halo"): F, Cl, Br, or I; and each R is independently H, alkyl, aryl, heterocycle, or a protecting group; or cations or anions thereof. As would be readily understood by one skilled in the art, when a substituent is keto (i.e., =O) or thioxo (i.e., =S), or the like, then two hydrogen atoms on the substituted atom are replaced.

As to any of the above groups that contain one or more substituents, it is understood, of course, that such groups do not contain any substitution or substitution patterns which are sterically impractical and/or synthetically non-feasible. In addition, the compounds of this invention include all stereochemical isomers arising from the substitution of these compounds.

The terms "stable compound" and "stable structure" are meant to indicate a compound that is sufficiently robust to survive isolation to a useful degree of purity from a reaction mixture, and formulation into an efficacious therapeutic agent. Only stable compounds are contemplated by and employed in the present invention.

As used herein, a "diacid" refers to any group that contains two carboxylic acid (—C(=O)OH) groups. The diacid can be an aliphatic dicarboxylic acid or an aromatic dicarboxylic acid. An aliphatic dicarboxylic acid is any alkyl group that is substituted with two (or more) carboxylic acid groups. An aromatic dicarboxylic acid is any compound that contains an at least one aryl group and two (or more) carboxylic acids. The two carboxylic acid groups can be on the same aryl group or they can be on different aryl groups. When the two carboxylic acid groups are on different aryl groups, the aryl groups can be linked by a single bond, or then can be linked by other groups, for example, an alkyl group. The alkyl group linking the aryl groups can be optionally substituted and optionally interrupted between carbons with other groups as defined herein.

As used herein, "polymer" refers to a molecule of one or more repeating monomeric residue units covalently bonded together by one or more repeating chemical functional groups. The term includes all polymeric forms such as linear, branched, star, random, block, graft and the like. It includes homopolymers formed from a single monomer, copolymers formed from two or more monomers, terpolymers formed from three or more polymers and other polymers formed from more than three monomers. Differing forms of a polymer may also have more than one repeating, covalently bonded functional group.

As used herein, "polyanhydride" refers to a polymer that is derived from the condensation of carboxylic acids or carboxylic acid derivatives such that repeating units of the polyanhydride are linked by anhydride (—C(=O)—O—C(=O)—) groups.

As used herein, "carboxylic anhydride" refers to a compound that contains an anhydride (—C(=O)—O—C(=O)—) group. A carboxylic anhydride typically contains only one anhydride group per molecule. Carboxylic anhydrides can be formed by the condensation of two carboxylic acids. Carboxylic anhydrides that can be used in conjunction with the methods described herein include bis-alkyl carboxylic anhydrides, bis-aryl carboxylic anhydrides, and mixed anhydrides. Examples include, but are not limited to acetic anhydride, trifluoroacetic anhydride, and benzoic anhydride. Mixed anhydrides can also be employed, such as acetic benzoic anhydride, which is the condensation product of acetic acid and benzoic acid.

As used herein, an "acyl" group is a group, such as a $(C_1-C_4)$alkyl group, that terminates in a carbonyl radical.

As used herein, an "acyloxy" group is a group, such as a $(C_1-C_4)$alkyl group, that terminates in a carboxyl radical.

As used herein, "acylated" refers to the conversion of a hydroxyl group into an acyloxy group. Acylation can be carried out by contacting a hydroxyl group or hydroxyl-containing group with a carboxylic anhydride.

As used herein, a "prepolymer" is a monomer, oligomer, or mixture thereof that can be converted into a polymer. Diacid prepolymers are typically acylated on their terminal carboxy groups. A prepolymer can be, for example, a bis(carboxylic acid acetyl ester), or an anhydride oligomer thereof. In another embodiment, a prepolymer can be a 1,ω-(4-acetoxycarbonylphenoxy)alkane, or an anhydride oligomer thereof. The phenoxy group of the 1,ω-(4-acetoxycarbonylphenoxy)alkane can have ortho, meta, or para substitution patters.

As used herein, a "homopolymer" is a polymer that is made up of repeating units of one type of monomer.

As used herein, a "copolymer" is a polymer that is made up of repeating units of two or more different types of monomers. In a random copolymer, the organization of the repeating units is random.

As used herein, "microwave radiation" refers to electromagnetic waves with wavelengths longer than those of infrared light, but shorter than those of radio waves. Microwaves have wavelengths approximately in the range of about 30 cm (frequency=1 GHz) to about 1 mm (300 GHz). The microwave range include ultra-high frequency (UHF) (0.3-3 GHz), super high frequency (SHF) (3-30 GHz), and extremely high frequency (EHF) (30-300 GHz) signals. As used herein, "irradiating" refers to exposing a sample to electromagnetic waves.

General Methods for Polyanhydride Synthesis

Novel methods of preparing polyanhydrides are described herein. Commercial diacids can be used as precursors for preparing prepolymers and the polyanhydrides. Techniques well known to those of skill in the art can also be used to prepare diacids for prepolymer and polyanhydride preparation. Many such techniques are well known in the art. Many of these known techniques are elaborated in *Compendium of Organic Synthetic Methods* (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6, Michael B. Smith; as well as in March, J., *Advanced Organic Chemistry*, 3rd Ed., (John Wiley & Sons, New York, 1985), *Comprehensive Organic Synthesis; Selectivity, Strategy & Efficiency in Modern Organic Chemistry*, in 9 Volumes, Barry M. Trost, Ed.-in-Chief (Pergamon Press, New York, 1993 printing), and Richard. C. Larock, *Comprehensive Organic Transformations*, $2^{nd}$ Ed., (Wiley-VCH, New York, 1999).

A number of examples of methods for the preparation of polyanhydrides are provided below. These methods are intended to illustrate the nature of such preparations are not intended to limit the scope of applicable methods.

Methods of Preparing Prepolymers

Microwave heating is a good candidate for high throughput synthesis of polymers because it can provide an increased rate of heating as a result of improved internal heating in comparison to conductive oil bath heating. Moreover, a number of microwave polycondensation reactions have appeared in the literature with the ability to produce high-molecular-weight polymers without employing vacuum to remove condensation by-products. However no attention has been given to the synthesis of polyanhydrides by microwave heating.

A standard commercial microwave can be used to irradiate the polyanhydride precursors, including both diacids and prepolymers. The standard frequency of a typical microwave oven that can be employed is 2.45 GHz, corresponding to about 12.2 cm wavelength of electromagnetic radiation. The microwave heating of reactions can decrease reaction time and can obtain higher yields than those obtained from the conventional heating, such as in an oil bath.

Prepolymer preparation typically results in a polydisperse material. Acylated prepolymers will typically have from 1 to about 12 monomeric units. Accordingly, a di-acylated dicarboxylic acid monomer can be a prepolymer. Also, an acylated anhydride oligomer can function as a prepolymer. Prepolymers prepared from aliphatic carboxylic acids typically results in longer oligomers than those prepared from aromatic carboxylic acids. In the prepolymer preparation process, the diacids are refluxed in acetic anhydride until the diacids dissolve. Aliphatic carboxylic acids tend to trans-acylate at a faster rate than the aromatic carboxylic acids, thus resulting in a higher content of oligomeric prepolymers than in the case of aromatic precursors.

When forming the prepolymer from diacids, a molar excess of a carboxylic anhydride can be employed. A molar excess is defined as more than one equivalent of carboxylic anhydride per carboxylic acid moiety present in the diacids. The excess carboxylic anhydride can be removed from the reaction vessel after the prepolymer has formed. One method of removing the excess carboxylic anhydride is to pass a suitable gas (such as nitrogen or argon) over the reaction vessel. This is typically done when the reaction vessel is still hot from the prepolymer formation process. Additional heating and/or vacuum may be used to aid in the removal process. Acetic acid formed in the reaction can also be removed by these techniques. Alternatively, the prepolymer can be removed from the reaction vessel and isolated by standard techniques, such as subjecting the reaction mixture to evaporation on a rotary evaporation device.

A catalyst can be used to facilitate the formation of the prepolymer. One example of a suitable catalyst is glass beads. The formation of the prepolymer and the polyanhydride can be carried out in the absence of any solvent.

A wide range of suitable diacids can be employed to prepare polyanhydrides. The diacid can be a diacid-substituted straight or branched chain alkane that is optionally interrupted by about one to about five —Ph—, —O—, —CH=CH—, and/or —N(R)— groups wherein R is H, phenyl, benzyl, or $(C_1-C_6)$alkyl. In one embodiment, the alkane is preferably $C_2-C_{12}$(alkyl). In another embodiment, the alkane is preferably $C_4-C_8$(alkyl). Additionally, the alkane group of the diacid can be optionally interrupted by about 1 to about 12 —OCH$_2$CH$_2$O— groups, for example, a poly(ethylene glycol) segment. The alkane group can also be optionally substituted with one, two, or three $(C_1-C_6)$alkyl, $(C_1-C_6)$alkenyl, trifluoromethyl, trifluoromethoxy, or oxo groups; or combinations thereof.

In one embodiment, a prepolymer can be prepared as illustrated in Scheme 1.

Scheme 1.

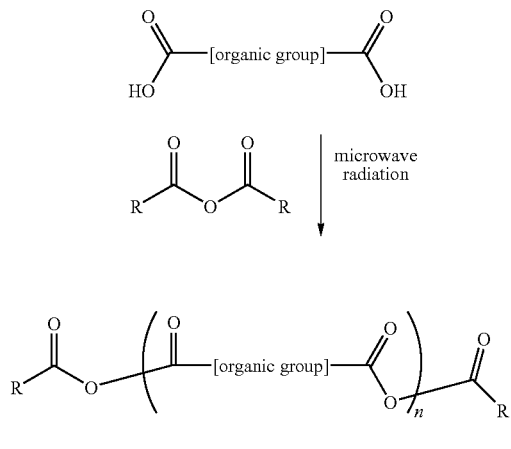

wherein "organic group" is any organic group that can link two carboxylic acid moieties, R is alkyl or aryl, and n is 1 to about 12. A molar excess of the carboxylic anhydride can be employed. About 2 to about 30 molar equivalents of the carboxylic anhydride can be used. Alternatively, about 5 to about 20 molar equivalents of the carboxylic anhydride can be used. In one embodiment, 6 molar equivalents of the carboxylic anhydride are employed. In another embodiment, 18 molar equivalents of the carboxylic anhydride are employed. The carboxylic anhydride can be, for example, acetic anhydride, trifluoroacetic anhydride, benzoic anhydride, combinations thereof, and/or derivatives thereof.

In another embodiment, a prepolymer can be prepared as illustrated in Scheme 2.

Scheme 2.

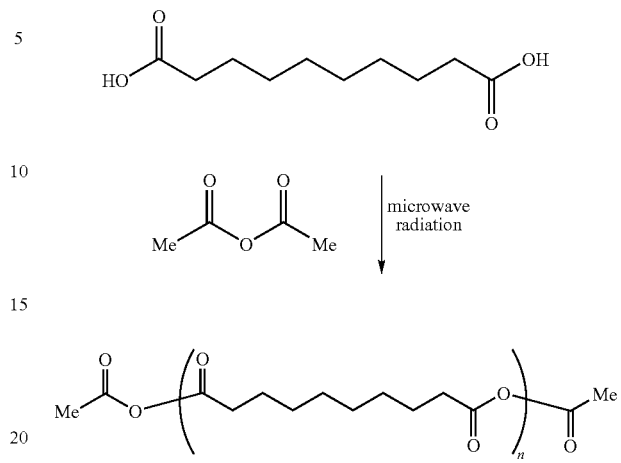

wherein n is 1 to about 12. Other carboxylic anhydrides can be used to form the end groups of the prepolymer. The central aliphatic group can optionally be substituted or interrupted as described herein.

The diacid can also be a 1,ω-bis(carboxy)alkane. As would be recognized by one skilled in the art, alternative nomenclature for a 1,ω-bis(carboxy)alkane is a 1,ω-alkanedioic acid that has two additional carbons in the alkane moiety compared to the corresponding bis(carboxy)alkane.

In another embodiment, a prepolymer can be prepared as illustrated in Scheme 3.

Scheme 3.

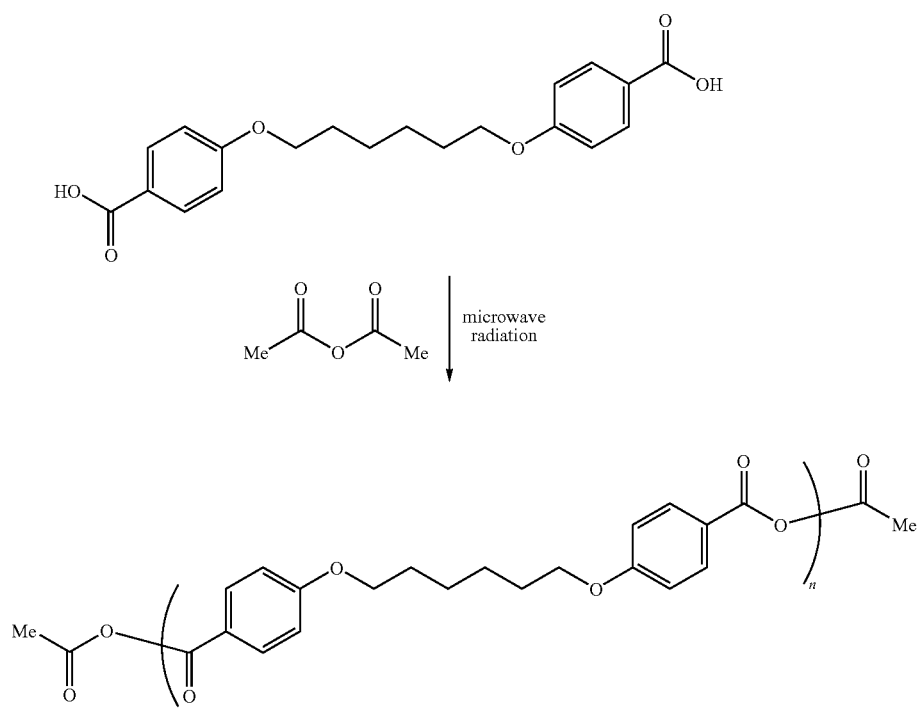

wherein n is 1 to about 12. Carboxylic anhydrides other than acetic anhydride can be used to form the end groups of the prepolymer. The central aliphatic group, the aryl groups, or both, can optionally be substituted, in any combination. The central aliphatic group can also be interrupted as described herein.

Accordingly, the diacid can be two aryl groups that are each substituted with a carboxy group wherein the aryl groups are linked by a straight or branched chain alkane that is optionally interrupted by about one to about five —Ph—, —O—, —CH=CH—, and/or —N(R)— groups wherein R is H, phenyl, benzyl, or ($C_1$-$C_6$)alkyl. In one embodiment, the alkane is preferably $C_2$-$C_{12}$(alkyl). In another embodiment, the alkane is preferably $C_4$-$C_8$(alkyl). Additionally, the alkane group linking the carboxylic acid-substituted aryl groups can be optionally interrupted by 1 to about 12 —OCH$_2$CH$_2$O— groups, for example, a poly(ethylene glycol) segment. The alkane group linking the carboxylic acid-substituted aryl groups can also be optionally substituted with one, two, or three ($C_1$-$C_6$)alkyl, ($C_1$-$C_6$)alkenyl, trifluoromethyl, trifluoromethoxy, or oxo groups; or combinations thereof.

The diacid can be a 1,ω-bis(4-carboxyphenoxy)alkane. In one embodiment, the alkane is a ($C_2$-$C_{10}$)alkane. In another embodiment, the alkane is preferably $C_4$-$C_8$(alkyl). In certain specific embodiments, alkane can be ethyl, propyl, butyl, pentyl, hexyl, heptyl, octyl, and branched isomers thereof. In one embodiment, the diacid is a 1,6-bis(4-carboxyphenoxy) hexane. In another embodiment, the diacid is a 1,6-bis(carboxy)octane. Mixtures of any of these diacids can be used in conjunction with the microwave facilitated methods described herein.

Methods of Preparing Polyanhydrides

Polyanhydrides can be prepared by irradiating a prepolymer with a sufficient amount of microwave irradiation to polymerize the prepolymer. A sufficient amount of microwave radiation can typically be generated by a conventional microwave oven set to 1100 Watts for about 1 to about 30 minutes. More often, a sufficient amount of microwave radiation can be generated in about 1 to about 20 minutes. The resulting polyanhydride can be a homopolymer or a copolymer, depending on the nature of the prepolymer composition used in the reaction.

A polyanhydride can also be prepared by forming a prepolymer in situ from diacids. The diacids can be converted into prepolymers by irradiating diacids in the presence of a carboxylic anhydride. The prepolymer can be prepared by, for example, by irradiating a mixture of (a) a carboxylic anhydride and (b) an aromatic dicarboxylic acid, an aliphatic dicarboxylic acid, or a mixture thereof, with an amount of microwave radiation effective to form the prepolymer. One suitable carboxylic anhydride is acetic anhydride. Other suitable carboxylic anhydrides include, for example, trifluoroacetic anhydride and benzoic anhydride.

The terminal groups of polyanhydrides prepared according to the methods described herein will typically have terminal acyl groups. It is possible for some hydrolysis of the polyanhydrides to occur during the reaction or during the isolation of the polyanhydride. Thus, some terminal groups of such polyanhydrides can be carboxylic acid groups. Accordingly, the methods of the invention include the preparation of polyanhydrides that terminate in acyl groups, carboxylic acid groups, or combinations thereof.

In one embodiment, the polyanhydride can be prepared as illustrated in Scheme 4.

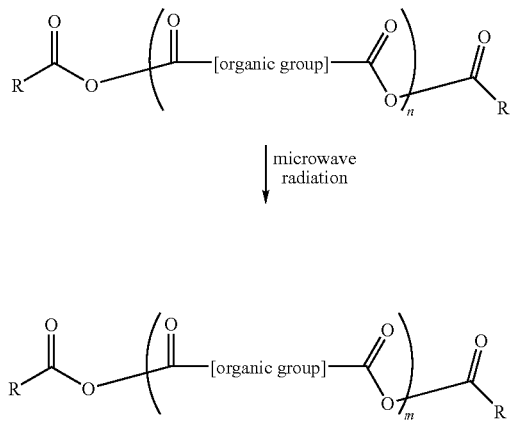

Scheme 4.

wherein "organic group" is any organic group that links two carboxylic acid moieties, R is alkyl or aryl, n is 1 to about 12, and m is about 5 to about 200.

In one embodiment, the polyanhydride can be prepared as illustrated in Scheme 5.

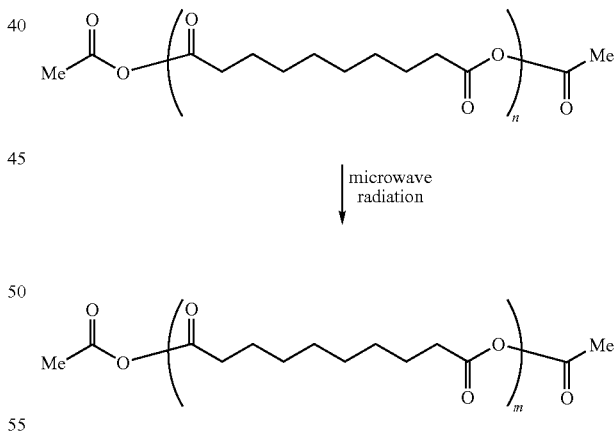

Scheme 5.

wherein n is 1 to about 12 and m is about 5 to about 200. In other embodiments, m can be about 10 to about 100, or about 10 to about 50. As would be understood by one skilled in the art, the value of m will typically be larger than the value of n. End groups other than acetate can be used and the central aliphatic group can be optionally substituted or optionally interrupted, or both, as described herein.

In another embodiment, the polyanhydride can be prepared as illustrated in Scheme 6.

Scheme 6.

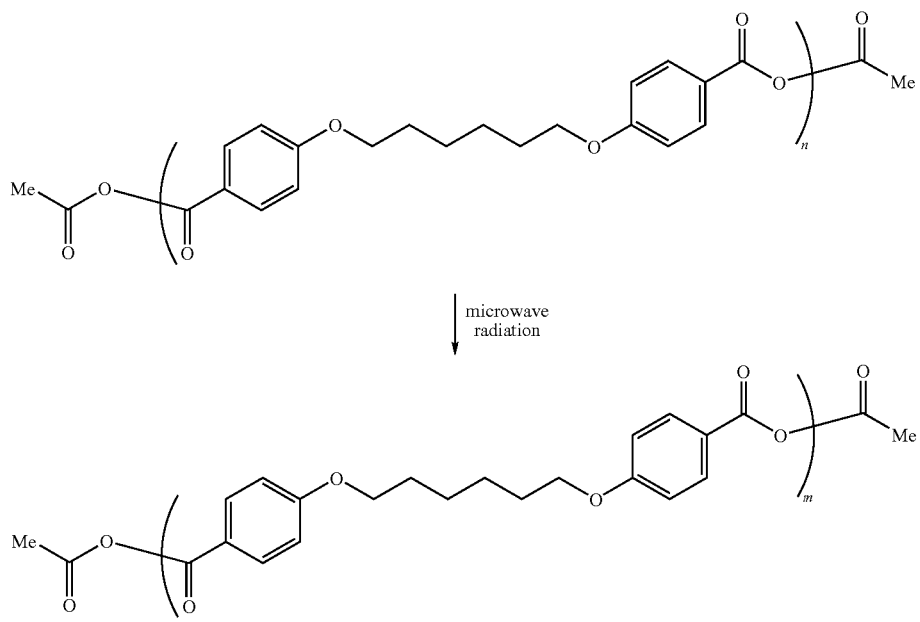

wherein n is 1 to about 12 and m is about 5 to about 100. In other embodiments, m can be about 10 to about 50, or about 15 to about 35. End groups other than acetate can be used and the central aliphatic group, the aryl groups, or both, can optionally be substituted, in any combination. The central aliphatic group can also be optionally interrupted as described herein.

EXAMPLES

General Materials and Methods

Chemicals used were purchased from Sigma-Aldrich (St. Louis, Mo.) with the exception of deuterated chloroform, which was purchased from Cambridge Isotope Laboratories, Inc (Andover, Mass.). Sebacic acid prepolymer and 1,6-bis-(p-carboxyphenoxy) hexane (CPH) were prepared as described by Conix (*Macromol. Synth.* 1966, 2, 95.).

Proton nuclear magnetic resonance ($^1$H NMR) spectroscopy was used to verify chemical structure and to determine the degree of polymerization for each polymer and prepolymer. NMR spectra were obtained on a Varian VXR 400 MHz spectrometer (Varian Inc. Palo Alto, Calif.). All compounds were characterized by $^1$H NMR in deuterated chloroform (99.8% atom-d) and chemical shifts were calibrated to the chloroform ($\delta$=7.26 ppm) peak. Microwave polymerizations were conducted in a 1.1 cubic foot microwave oven (JE1160WC, General Electric) with maximum power of 1,100 watts.

Before any experiments were conducted, the microwave was calibrated for hot spots by moistening a large piece of filter paper and placing it on the glass plate. The paper was subjected to microwave radiation on high (1,100 Watts) for 15 minutes resulting in usable space (i.e., space not subject to hot spot radiation) that was 8 inches in diameter. All reactions were kept within this ring to keep field levels consistent.

Microwave experiments were broken down into two classes: first, reactions of prepolymer to directly produce polyanhydrides (Example 1); and second, in situ formation of prepolymer from diacid and polymerization in the microwave (Examples 2 and 3). The initial polymerization studies were conducted on homopolymers of sebacic acid (SA) and 1,6-bis(p-carboxyphenoxy)hexane (CPH) because of their widespread acceptance as carriers for therapeutic compounds.

Example 1

Reactions of SA and CPH Prepolymer To Directly Produce Polyanhydrides

Pure sebacic anhydride prepolymer was placed in a borosilicate vial with cap and subjected to microwave radiation (1,100 watts) for 2 to 25 minutes. An identical procedure was used for the polymerization of CPH diacid prepolymer. The sebacic acid prepolymer (1) and the CPH prepolymer (2) have the following structures:

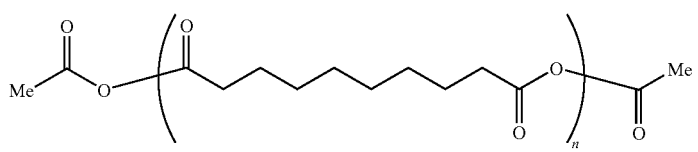

1

-continued

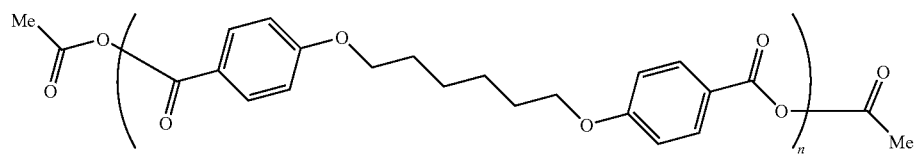

wherein n is 1 to about 12. The microwave polymerizations of sebacic anhydride prepolymer resulted in oligomers formed with a large percentage of chains having an acid end-group, which caused the polymerization reaction to terminate.

Catalysts were analyzed to determine their effect on the molecular weight of polymers formed from prepolymers. Catalysts such as calcium oxide, aluminum oxide, and silica were added to the reaction vials. The results with catalysts were similar to those obtained without catalysts: oligomers with acid end-groups. Good results were obtained when the prepolymer was subjected to microwaves heating on a glass plate or in a bath of glass beads. Table 1 shows the polymerization experiment results using sebacic anhydride prepolymer and catalysts in a microwave.

TABLE 1

Number-average molecular weight of samples polymerized in a microwave using sebacic anhydride prepolymer. The sample ID is labeled as type of catalyst__time; SA refers to sebacic anhydride prepolymer. SA__prepolymer is the unreacted prepolymer.

| Sample ID | $\overline{M}_n$ g·mol$^{-1}$ | DP | Time min |
|---|---|---|---|
| SA__prepolymer | 2,017 | 11 | — |
| SA__SiO$_2$__4 min | 1,482 | 8 | 4 |
| SA__SiO$_2$__25 min | 2,112 | 11 | 25 |
| SA__Al$_2$O$_3$__25 min | 5,169 | 28 | 25 |
| SA__CaO__10 min | 2,929 | 16 | 10 |
| SA__sand__CaO__25 min | 2,363 | 13 | 25 |
| SA__beads__70%__25 min | 11,358 | 61 | 25 |
| SA__beads__7 min | 7,542 | 41 | 7 |
| SA__plate__5 min | 1,751 | 9 | 5 |

In Table 1, for the Sample ID "SA_beads__70%__25 min", 70% refers to the power level of the microwave. For the microwave used in this experiment, the percentage specified how long the sample is exposed to microwave radiation over the time period specified. This percent is in effect a dosage. For example, for a 60 second exposure at 100%, the irradiation would be continuous for the entire duration. At 70%, the radiation would be "on" for 42 seconds of the 60 second period. "Beads" and "plate" refer to glass beads and a glass plate, respectively.

The degree of polymerization (DP) was determined by end-group analysis as described in the literature (F. A. Bovey, "Chain Structure, Conformation of Macromolecules", Academic Press, New York, N.Y. 1982, p. 259; McCann et al. *Polymer* 1998, 40, 2151; and Ron et al. *Macromolecules* 1991, 24, 2278).

Poly(SA), poly(CPH), and SA-CPH copolymers have been synthesized by conventional melt techniques with $\overline{M}_n$ in the order of 20,000 to 25,000 g·mol$^{-1}$, with and without the use of catalysts from prepolymer. The microwave synthesis results shown in Table 1 suggest that the prepolymer may be highly reactive in the microwave and possibly thermally degraded before sufficient polymerization could commence.

Example 2

In-Situ Formation of Prepolymer from Diacid and Microwave Polymerization

In-situ formation of prepolymer was performed by adding equivalents of acetic anhydride to sebacic acid and reacting the contents of the vial in the microwave with the vial cap on, and then removing acetic acid and the excess acetic anhydride before polymerizing in the microwave.

Sebacic acid (0.100 g, 0.494 mmol) and acetic anhydride (0.3003 g, 2.95 mmol) were placed in a borosilicate vial with cap and subjected to microwave radiation (1,100 watts) for 2 minutes. The vial was then carefully removed from the microwave. Acetic acid and unreacted acetic anhydride was then evaporated (while hot) by an inert gas (argon) before replacing in the microwave sans cap and subjected to microwave radiation (1,100 watts) for 2 to about 25 minutes. The polymerization times were varied from 2 to 8 minutes for sebacic acid and 10 to about 20 minutes for CPH polymerizations. The results of the experiments are summarized in Table 2.

TABLE 2

Number-average molecular weight of all samples polymerized in the microwave with in-situ prepolymer preparation. AA = number of equivalents of acetic anhydride; SAc refers to sebacic anhydride prepolymer; CPHAc refers to 1,6-bis-(p-carboxyphenoxy) hexane prepolymer.

| Monomer | $\overline{M}_n$ 6 AA (g·mol$^{-1}$) | DP | $\overline{M}_n$ 9 AA (g·mol$^{-1}$) | DP | $\overline{M}_n$ 12 AA (g·mol$^{-1}$) | Dp | Time (min) |
|---|---|---|---|---|---|---|---|
| SAc | 4,973 | 23 | 3,089 | 17 | 2,223 | 12 | 2 |
| SAc | 6,460 | 35 | 3,359 | 18 | 3,674 | 20 | 3 |
| SAc | 10,441 | 56 | 8,290 | 45 | 5,044 | 27 | 4 |
| SAc | 14,582 | 78 | 8,916 | 48 | 8,554 | 46 | 5 |
| SAc | 13,229 | 71 | 9,162 | 49 | 7,616 | 41 | 6 |
| SAc | 8,547 | 46 | 8,392 | 45 | 8,384 | 45 | 7 |
| SAc | 5,080 | 27 | 11,678 | 63 | 5,490 | 29 | 8 |
| SAc (1 g) | 3,134 | 17 | 3,025 | 16 | 3,538 | 19 | 6 |

| Monomer | $\overline{M}_n$ 12 AA (g·mol$^{-1}$) | DP | $\overline{M}_n$ 15 AA (g·mol$^{-1}$) | DP | $\overline{M}_n$ 18 AA (g·mol$^{-1}$) | DP | Time (min) |
|---|---|---|---|---|---|---|---|
| CPHAc | 8,180 | 23 | 8,306 | 23 | 7,213 | 20 | 10 |
| CPHAc | 8,517 | 24 | 9,496 | 27 | 14,076 | 39 | 15 |
| CPHAc | 13,984 | 39 | 14,378 | 40 | 15,888 | 44 | 20 |

Results and Discussion

The CPH acid required longer times to attain high molecular weight. Experiments were performed to determine the effect of adding more acetic anhydride on the degree of polymerization. In general, the Mn of poly(SA) reached a maximum at about 5 minutes, with 6 equivalents of acetic anhydride producing higher molecular weights than 9 or 12 equivalents of acetic anhydride. CPH acid yielded the highest $\overline{M}_n$ when subjected to 20 equivalents of acetic anhydride for 20 minutes. It should be noted that all the polymers synthesized with the microwave method were greater than 99% pure as determined from NMR spectroscopy.

The maximum DP for sebacic acid samples was explained by the ability to remove the excess acetic anhydride between the acetylation reaction and polymerization. With more acetic anhydride, it took longer to remove the excess between prepolymer formation and polymerization. It is possible that when less acetic anhydride was removed there was a shift in the polymerization reaction equilibrium.

Microwave polymerization of a larger batch size (1 g) of polyanhydrides was also found to be feasible and such reactions produced polymer after reaction for 5 to 6 minutes. Lower batch sizes (100 mg), however, yielded higher-molecular-weight polymers for a given time and acetic anhydride equivalence. This was attributed to a mass-transfer limitation of the removal of excess acetic anhydride from the condensation reaction under the techniques employed.

All samples were dried under vacuum overnight before characterization:

Poly(sebacic anhydride) (Poly(SA)). $^1$H NMR (CDCl$_3$): δ=1.3 (m, H$^8$), 1.65 (m, H$^4$), 2.2 (s, H$^6$ acetyl end), 2.3 (t, H$^2$ a to acid end), 2.4 (m, H$^4$ a to SA-SA).

Poly[1,6-bis(p-carboxyphenoxy)hexane] (Poly(CPH)). $^1$H NMR (CDCl$_3$): δ=1.5 (m, H$^4$), 1.7 (m, H$^4$), 2.2 (s, H$^6$ acetyl end), 4.1 (m, H$^4$), 6.95 (d, H$^4$), 8.0 (d, H$^4$ CPH-End), 8.1 (d, H$^4$ CPH—CPH).

Example 3

Preparation of SA/CPH Copolymer by Microwave Polymerization

Copolymers of SA and CPH were prepared in a microwave and compared to conventionally synthesized copolymers. SA and CPH monomers were placed in a vial, acetic anhydride was added, and microwave irradiation was conducted as described in Example 2. The arrangement of the monomers in the poly(CPH-co-SA) copolymers formed by microwave polymerizations were found to be random (degree of randomness=1+/−9%). The results are summarized in Table 3 and in FIG. 1.

TABLE 3

Number-average molecular weights of copolymers polymerized in the microwave with in situ prepolymer preparation. All samples were polymerized for 15 minutes with 18 equivalents of acetic anhydride.

| Copolymer | DP | $\overline{M}_n$ g·mol$^{-1}$ | Degree of randomness |
|---|---|---|---|
| CPH-SA_13-87 | 50 | 17,918 | 1.03 |
| CPH-SA_70-30 | 40 | 14,419 | 0.91 |
| CPH-SA_87-13 | 40 | 14,419 | 0.97 |

All samples were dried under vacuum overnight before characterization. Poly[1,6-bis(p-carboxyphenoxy)hexane-co-sebacic anhydride] (poly(CPH-co-SA)). $^1$H NMR (CDCl$_3$): δ=1.35 (m, H$^8$), 1.6 (m, H$^4$), 1.7 (m, H$^4$), 2.2 (s, H$^6$), 2.3 (s, H$^6$), 2.4 (t, H$^4$ α to SA-SA), 2.6 (t, H$^4$ SA-CPH), 4.1 (m, H$^4$), 6.95 (d, H$^4$), 8.0 (d, H$^4$ CPH-SA), 8.1 (d, H$^4$ CPH—CPH).

The degree of polymerization, average monomer segment lengths, and degree of randomness were all calculated from NMR spectra. The degree of randomness is a measure of "blockiness" of the copolymer. Values less than one are more block-like while values greater than one denote random copolymer behavior. Polyanhydrides are considered to have reactivity ratios of one; simply stated, they form random copolymers when copolymerized with another anhydride. This result was confirmed by the degree of randomness calculation, which indicated that the copolymers formed by microwave polymerizations are random. These results agree with previously published values for the degree of randomness for the poly(CPH-co-SA) system obtained by conventional polymerization techniques under vacuum (Ron, Mathiowitz, Mathiowitz, Domb, and Langer, *Macromolecules* 1991, 24, 2278). It should be noted that copolymers with asymmetric monomer feeds (80:20, 20:80) have longer sequence lengths of the component in excess, which is more block like. This behavior has been demonstrated previously for the conventional-melt polycondensation of poly(CPH-co-SA).

Accordingly, microwave polymerization was shown to be a novel technique to rapidly synthesize a large number of pure polyanhydrides without the need to use vacuum or isolate an acetylated prepolymer before polymerization. This method can produce number-average molecular weights comparable to those obtained by conventional polycondensation under vacuum while decreasing the time of reaction from 1.5 hours (or days from diacid precursors) to 6 to 20 minutes depending on the character of the monomer. Microwave polymerizations have been shown to work for small batch sizes up to samples as large as about 1 gram.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method for preparing a polyanhydride comprising:
   irradiating one or more diacids, wherein the one or more diacids comprise an aromatic dicarboxylic acid, an aliphatic dicarboxylic acid, or a mixture thereof, with microwave radiation in the presence of a carboxylic anhydride so as to acylate the one or more diacids to yield at least one prepolymer, and
   irradiating the prepolymer with microwave radiation so as to polymerize said prepolymer to yield the polyanhydride, as a homopolymer or a copolymer.

2. The method of claim 1 wherein the at least one prepolymer comprises about 1 to about 12 diacid units.

3. The method of claim 1 wherein the mixture is polymerized to yield a random copolymer.

4. The method of claim 1, wherein at least one diacid comprises a diacid-substituted C$_2$-C$_{12}$ straight or branched chain alkane that is optionally interrupted by about 1 to about 5 —Ph—, —O—, —CH=CH—, or —N(R)— groups, or combinations thereof, wherein R is H, phenyl, benzyl, or (C$_1$-C$_6$)alkyl; is optionally interrupted by about 1 to about 12 —OCH$_2$CH$_2$O—; and is optionally substituted with 1, 2, or 3 (C$_1$-C$_6$)alkyl, (C$_1$-C$_6$)alkenyl, trifluoromethyl, trifluoromethoxy, or oxo groups; or combinations thereof.

5. The method of claim 1, wherein the at least one diacid comprises a 1,ω-bis(carboxy)alkane.

6. The method of claim 1, wherein the at least one diacid comprises a 1,ω-bis(4-carboxyphenoxy)alkane.

7. The method of claim 4 wherein the alkane is a (C$_3$-C$_8$) alkane.

8. The method of claim 4 wherein the alkane is a hexane or an octane.

9. The method of claim 1 wherein the diacid is 1,6-bis(4-carboxyphenoxy)hexane.

10. The method of claim 1 wherein the diacid is 1,6-bis(carboxy)octane.

11. The method of claim 1, wherein the at least one prepolymer comprises a bis(carboxylic acid acetyl ester), or an anhydride oligomer thereof.

12. The method of claim 1, wherein the at least one prepolymer comprises a 1,ω-(4-acetoxycarbonylphenoxy)alkane, or an anhydride oligomer thereof.

13. The method of claim 1 wherein the prepolymer is formed in situ by irradiating a mixture of (a) a carboxylic anhydride and (b) the aromatic dicarboxylic acid, the aliphatic dicarboxylic acid, or the mixture thereof, with an amount of microwave radiation effective to form the prepolymer.

14. The method of claim 1 wherein the carboxylic anhydride comprises a bis-alkyl carboxylic anhydride, a bis-aryl carboxylic anhydride, an alkyl-aryl carboxylic anhydride, or a mixture thereof.

15. The method of claim 1 wherein the carboxylic anhydride is acetic anhydride.

16. The method of claim 1 wherein a molar excess of the carboxylic anhydride is employed and excess carboxylic anhydride is removed after the prepolymer has formed.

17. The method of claim 1 wherein the radiation polymerization is conducted in the presence of an effective amount of a catalyst.

18. The method of claim 17 wherein the catalyst comprises glass beads or a glass surface.

19. The method of claim 1 wherein the irradiation of the prepolymer or prepolymer mixture is carried out in the absence of solvent.

20. The method of claim 13 wherein the irradiation of the carboxylic anhydride and the aromatic dicarboxylic acid, the aliphatic dicarboxylic acid, or the mixture thereof, is carried out in the absence of solvent.

21. A method for preparing a polyanhydride comprising:
irradiating a prepolymer with microwave radiation so as to polymerize the prepolymer to yield the polyanhydride, as a homopolymer or a copolymer.

22. A method for preparing a polyanhydride comprising:
irradiating one or more diacids, wherein the one or more diacids comprise 1,ω-bis(carboxy)alkane, 1,ω-bis(carboxyphenoxy)alkane, or a mixture thereof, with microwave radiation in the presence of acetic anhydride so as to acylate one or more diacids to yield at least one prepolymer, wherein the prepolymer is formed in situ by employing a molar excess of the acetic anhydride;
removing excess acetic anhydride after the prepolymer is formed; and
irradiating the prepolymer with microwave radiation so as to polymerize said prepolymer to yield the polyanhydride, as a homopolymer or a copolymer.

* * * * *

UNITED STATES PATENT AND TRADEMARK OFFICE
CERTIFICATE OF CORRECTION

| | | |
|---|---|---|
| PATENT NO. | : 7,659,322 B1 | Page 1 of 1 |
| APPLICATION NO. | : 11/275168 | |
| DATED | : February 9, 2010 | |
| INVENTOR(S) | : Vogel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Twenty-eighth Day of December, 2010

David J. Kappos
*Director of the United States Patent and Trademark Office*